(12) United States Patent
Reynolds

(10) Patent No.: US 8,256,651 B2
(45) Date of Patent: Sep. 4, 2012

(54) SHOPPING CART ORGANIZER

(76) Inventor: Sally B. Reynolds, Raleigh, NC (US)

(*) Notice: Subject to any disclaimer, the term of this patent is extended or adjusted under 35 U.S.C. 154(b) by 743 days.

(21) Appl. No.: 12/320,901

(22) Filed: Feb. 6, 2009

(65) Prior Publication Data
US 2010/0200629 A1   Aug. 12, 2010

Related U.S. Application Data

(60) Provisional application No. 61/071,786, filed on May 16, 2008.

(51) Int. Cl.
*B60R 22/10* (2006.01)

(52) U.S. Cl. .... 224/411; 224/277; 224/275; 297/256.17

(58) Field of Classification Search .................. 224/411, 224/277, 275; 116/306, 313, 316; 280/33.992, 280/33.993; 40/308, 492; 297/256.17, 136, 297/174 R
See application file for complete search history.

(56) References Cited

U.S. PATENT DOCUMENTS

| | | | | |
|---|---|---|---|---|
| 706,528 | A | * | 8/1902 | Christian ........................ 116/316 |
| 1,895,338 | A | * | 1/1933 | Neumann .................. 297/174 R |
| D153,348 | S | | 4/1949 | Gainsbro |
| 2,888,761 | A | | 6/1959 | Miller |
| 3,251,543 | A | * | 5/1966 | Bush et al. ..................... 235/1 R |
| 3,539,204 | A | * | 11/1970 | Keller .............................. 281/45 |
| 3,606,457 | A | * | 9/1971 | Reay ............................... 297/488 |
| 3,964,134 | A | | 6/1976 | Newtson |
| 4,274,567 | A | | 6/1981 | Sawyer |
| 4,512,504 | A | | 4/1985 | Owlett |
| 4,655,502 | A | * | 4/1987 | Houllis ......................... 297/229 |
| 4,666,207 | A | * | 5/1987 | Quartano ....................... 297/229 |
| 4,805,937 | A | * | 2/1989 | Boucher et al. ........... 280/33.992 |
| 5,086,960 | A | | 2/1992 | Schwietzer |
| 5,238,293 | A | | 8/1993 | Gibson |
| 5,244,175 | A | | 9/1993 | Frankel |
| D352,588 | S | | 11/1994 | Orphan |
| 5,362,077 | A | * | 11/1994 | Adamson ................. 280/33.992 |
| D355,063 | S | | 1/1995 | Pirnat |
| 5,494,308 | A | | 2/1996 | Southerland |
| 5,544,396 | A | | 8/1996 | Mekyska |
| 5,566,609 | A | | 10/1996 | Kirschner |

(Continued)

OTHER PUBLICATIONS

Website, http://www/amazon.com/gp/product/images/B0002FYR20/sr=1-18/qid=1194359476/ref=d . . . , Barbie Scan 'n Play Shopping Cart, three sheets printed from the internet on Nov. 6, 2007.

(Continued)

*Primary Examiner* — Nathan J Newhouse
*Assistant Examiner* — Steven M Landolfi, Jr.
(74) *Attorney, Agent, or Firm* — Richard C. Litman

(57) ABSTRACT

The shopping cart organizer fits removably into the child's seat area of a shopping cart, and facilitates the monitoring of a child by a parent or guardian shopper during a shopping trip. The device includes two rigidly connected panels and a hinged panel that permit the devices to fold and nest compactly for storage when not in use. A first panel serves as a seat bottom for the child's seating area, and may be padded. A second panel extends upwardly and rearwardly from the first panel to face a rearwardly facing child in the child's seat, and includes a series of shopping related features thereon to keep the child occupied. A third panel extends outwardly and rearwardly from the upper edge of the second panel to face the shopper and includes a series of aids to assist the shopper, e.g., charts, coupon and list holders, calculator, article storage hooks, etc.

8 Claims, 3 Drawing Sheets

U.S. PATENT DOCUMENTS

| | | | |
|---|---|---|---|
| 5,597,104 A | | 1/1997 | Elliott |
| 5,720,520 A * | | 2/1998 | Bengtson et al. .......... 297/250.1 |
| 6,000,610 A | | 12/1999 | Talbott et al. |
| D423,176 S | | 4/2000 | Cherry et al. |
| 6,129,417 A | | 10/2000 | Cohen-Fyffe |
| 6,206,471 B1 * | | 3/2001 | McGowan ............... 297/256.17 |
| 6,299,119 B1 * | | 10/2001 | Dunning .................. 248/346.03 |
| D477,717 S | | 7/2003 | Gillenwater |
| 6,676,210 B1 * | | 1/2004 | Peyton .................... 297/219.12 |
| 6,714,837 B1 | | 3/2004 | Brackmann et al. |
| 6,848,743 B1 * | | 2/2005 | Collins .................... 297/256.17 |
| 6,851,749 B2 * | | 2/2005 | Norman .................... 297/256.17 |
| 7,029,066 B1 * | | 4/2006 | Myers-Jones .............. 297/219.1 |
| 7,100,982 B2 | | 9/2006 | Lundgren |
| 2004/0080129 A1 | | 4/2004 | Myers et al. |
| 2008/0248712 A1 * | | 10/2008 | Gressianu et al. ............ 446/227 |

OTHER PUBLICATIONS

Website, http://www.kazekup.com, Kaz e Kup cupholder, six sheets printed from the internet on Jan. 30, 2008.

* cited by examiner

SHOPPING CART ORGANIZER

CROSS-REFERENCE TO RELATED APPLICATION

This application claims the benefit of U.S. Provisional Patent Application Ser. No. 61/071,786, filed May 16, 2008.

BACKGROUND OF THE INVENTION

1. Field of the Invention

The present invention relates generally to accessories for mobile pushcarts, baskets, containers, and similar conveyances. More particularly, the present invention relates to a shopping cart organizer that may include a child's seat with an educational activity and/or entertainment panel, storage for various articles, and/or one or more charts and aids to assist the shopper.

2. Description of the Related Art

Shopping, particularly grocery shopping, is often an ordeal when the shopper is accompanied by one or more small children. Children can be quite demanding, particularly in the store environment with its myriad attractions. Meanwhile, the shopper must attend to the child, check a list, locate items on the list in the store, manage various coupons and/or customer savings cards or tags, keep track of other personal items, etc. With all of the above distractions, it is understandable that one or more items may fail to make it into the cart for checkout, and/or maximum benefit of various coupons, sales, etc. is not obtained.

Accordingly, a number of different devices have been developed in the past, with the aim of these devices being to facilitate the shopping experience for the consumer. For example, the built-in, folding child's seat is nearly universal in shopping carts, and assists the shopper in monitoring and caring for the child while shopping. Other devices have been developed as well, such as indexes and store layout maps provided by the store, writing boards that are attachable to the handlebar of the cart, etc. While these various devices all provide some assistance to the shopper, none serve to fill a number of the most frequent needs of the shopping parent or guardian during a shopping trip.

Thus, a shopping cart organizer solving the aforementioned problems is desired.

SUMMARY OF THE INVENTION

The shopping cart organizer is a multiple panel device that fits removably into the area of the conventional folding child's seat in a shopping cart and extends upwardly and rearwardly therefrom. The first panel comprises a seat bottom, which may be padded or cushioned. This panel rests atop the conventional seat bottom of the deployed child's seat. A second panel is hinged to and extends from the rearward edge of the first or seat bottom panel, with the rearwardly facing child also facing this second panel. The second panel serves as a child's activity panel and includes various shopping-related features to keep the child occupied during the shopping trip. A third panel extends outwardly from the upper edge of the second panel and rearwardly beyond the shopping cart basket to face the shopper. This third panel includes various aids to assist the shopper, e.g., a food pyramid chart, coupon and list holders, a calculator, etc.

The relatively thin but rigid structure comprising the child's activity panel and shopper's panel, along with the hinged seat bottom panel extending from the child's activity panel, permit the devices to be folded and nested compactly for efficient storage. The store may keep a supply of such devices on hand to be checked out by shoppers who need them when they visit the store, or alternatively individual consumers may purchase the devices for their own use, as desired. The child seating area serves as a handy smaller storage area for a purse and other personal items even when no child is being carried in the cart, with the solid seat bottom providing an advantage for carrying small articles that might otherwise slip through the spacing of the conventional heavy wire structure of most carts.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a shopping cart organizer, comprising a series of panels that fit removably within and rearwardly of the child's seat area in a conventional shopping cart. The device serves both to entertain and educate a small child riding within the cart, and also to assist the shopper as he or she maneuvers the cart during a shopping trip.

Figure 1:
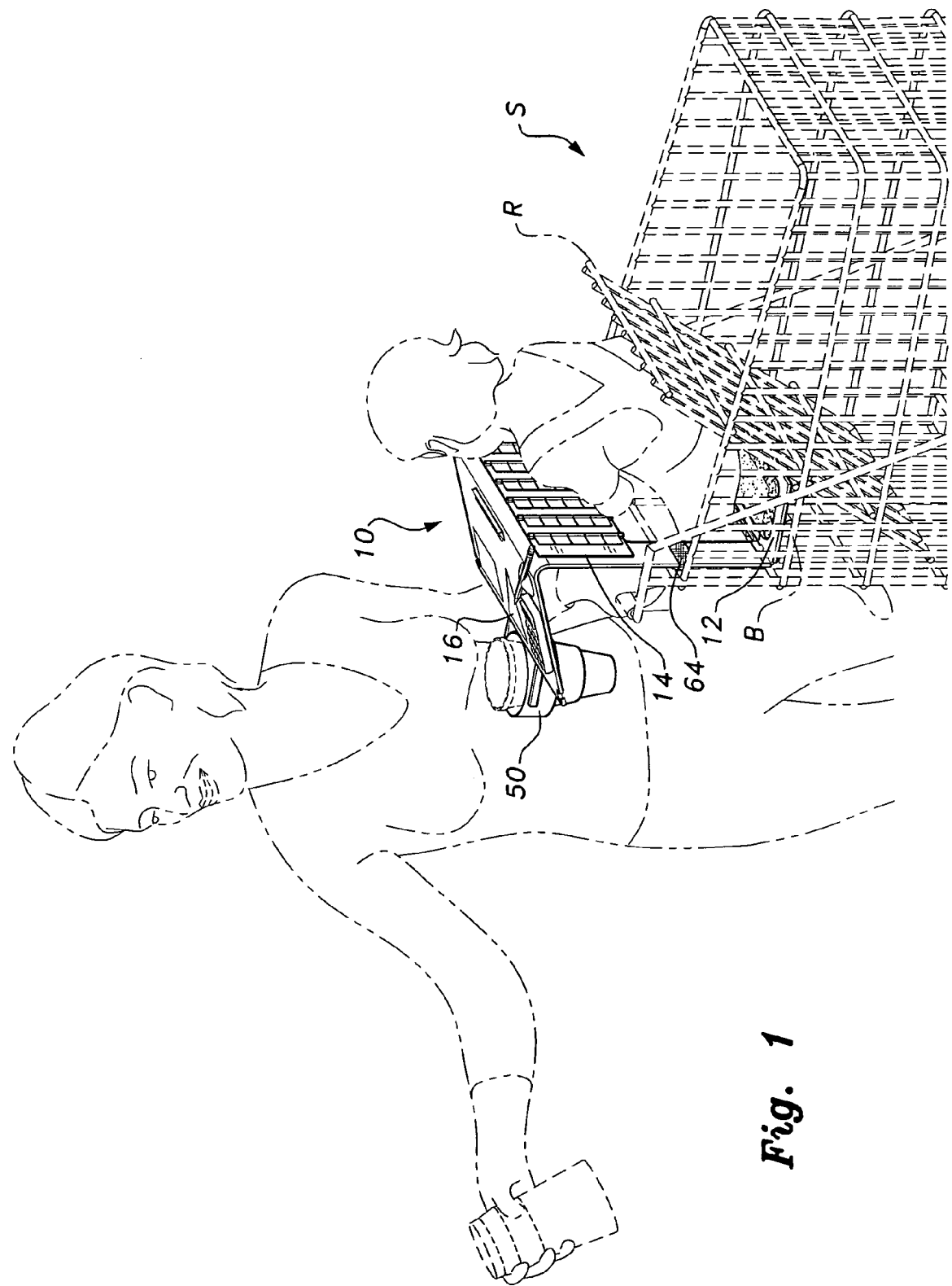
FIG. 1 is an environmental, perspective view of a shopping cart organizer according to the present invention removably installed in a shopping cart, showing its general configuration and function.

FIG. 1 of the drawings provides an environmental perspective view of a conventional shopping cart S having a forwardly extending rear panel R with a child's seat bottom B extending between the rear of the cart and the rear panel when the rear panel R is angled forward in the cart. The shopping cart organizer 10 includes a child's seat bottom panel 12 adapted for removable placement atop the child's seat bottom B of the shopping cart, S, with a child's activity panel 14 extending upwardly and rearwardly from the seat bottom panel 12 when the organizer 10 is properly placed within the cart. A shopper's assistance panel 16 extends rearwardly from the upper edge of the child's activity panel 14, above the conventional handlebar of the shopping cart S.

Figure 2:
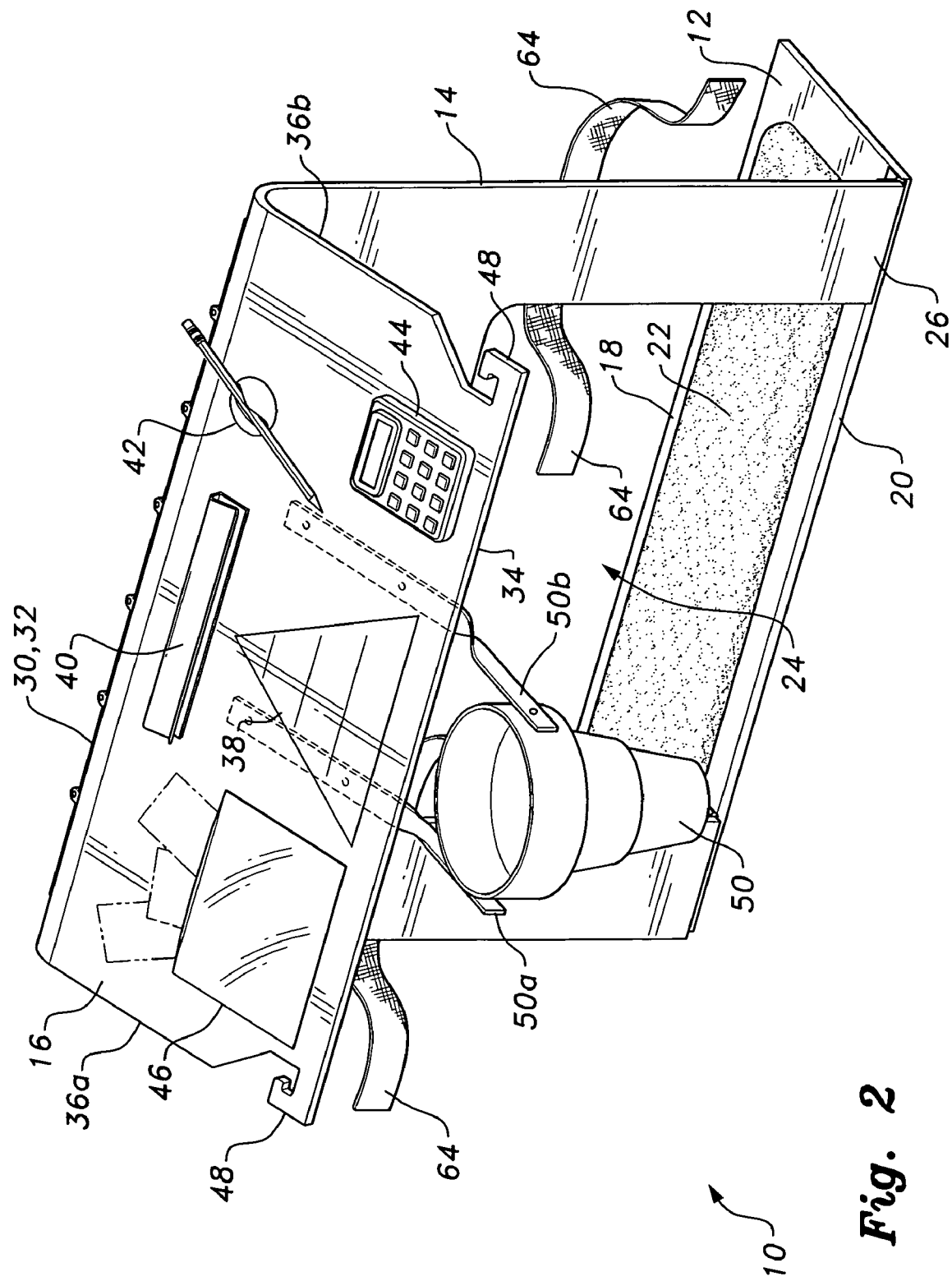
FIG. 2 is a rear perspective view of the shopping cart organizer, showing various features of the shopper's assistance panel.
Figure 3:
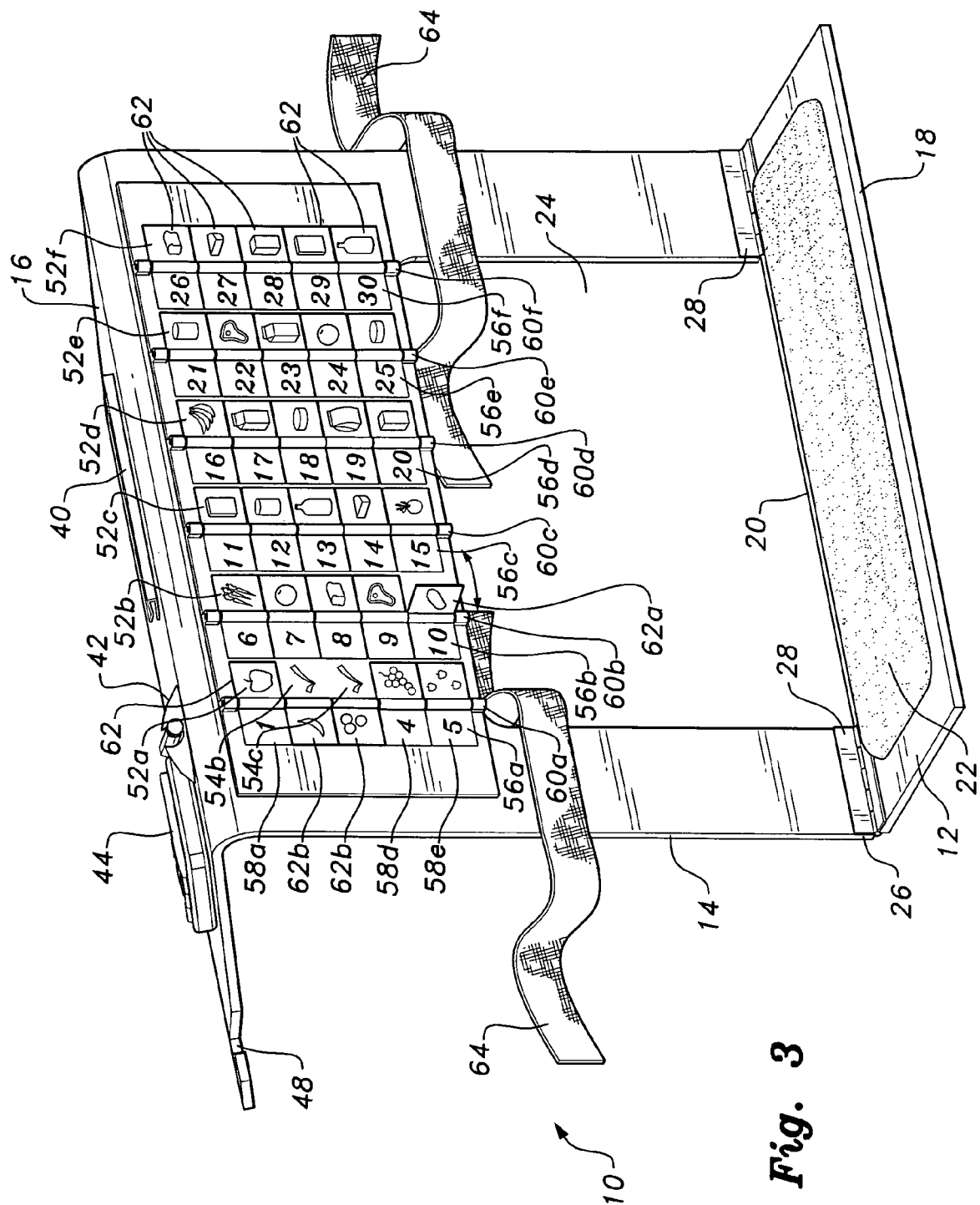
FIG. 3 is a front perspective view of the shopping cart organizer, showing various details of the child's activity panel.

FIGS. 2 and 3 of the drawings respectively illustrate a rear perspective view of the organizer 10 showing details of the shopper's assistance panel 16 and a front perspective view showing details of the child's activity panel 14. Each of the panels 12 through 16 is formed of a rigid sheet of material, e.g., a durable plastic, although other materials (sheet metal, wood, etc.) may be used alternatively. The child's seat bottom panel 12 includes a forward edge 18, i.e., the edge oriented toward the front of the shopping cart S when the organizer 10 is placed therein, and an opposite rearward edge 20 to which the child's activity panel 14 attaches. The child's seat bottom panel 12 may include cushioning, upholstery or the like thereon, indicated by the numeral 22 in the drawings.

The child's activity panel 14 is formed with a lower central passage 24 therethrough, to provide for placement of the legs of a child riding in the child's seating area of the shopping cart. The outboard portions of the panel 14 define a panel lower edge 26 that attaches to the rear edge 20 of the seat panel 12. The two panels 12 and 14 are preferably attached to one another by hinges 28 (FIG. 3), to allow the seating panel 12 to be folded against the child's activity panel 14 for more compact storage. However, the two panels may be rigidly and immovably affixed to one another, if so desired.

The shopper's assistance panel 16 extends from the upper edge 30 of the child's activity panel 14, with the forward edge 32 of the shopper's assistance panel 16 being joined to the upper edge 30 of the child's activity panel 14. The opposite rearward edge 34 of the shopper's assistance panel 16 is oriented toward the shopper pushing the cart when the organizer 10 is properly installed within the cart, with first and second lateral edges 36a and 36b extending between the forward and rearward edges 32 and 34 of the panel 16. Preferably, the two panels 14 and 16 are formed of a single, continuous sheet of material with a bend defining the upper edge of the child's activity panel and forward edge of the shopper's assistance panel. In this manner, the shopper's assistance panel 16 is rigidly and immovably affixed to the child's activity panel 14, extending rearwardly therefrom in a cantilever configuration. Alternatively, the two panels 14 and 16 may be formed as separate components and attached to one another by hinges, as in the case of the child's seating panel 12 and child's activity panel 14. In such a configuration, additional bracing may be provided to support the shopper's assistance panel 16 at the desired height and angle.

The shopper's assistance panel 16 may include a plurality of components and aids to assist the shopper as he or she shops. In the example of FIG. 2, the panel 16 includes an informational chart thereon, specifically a food pyramid chart 38. Other informational charts, e.g., a unit conversion chart, a map or index of the store layout, etc., may be provided in addition to or in lieu of the chart 38, if so desired. A shopping list holder or clip 40 is installed near the upper or forward edge 32 of the panel, allowing the shopper to easily secure or remove a shopping list or the like to or from the panel. A pencil or pen holder 42 is installed adjacent the shopping list holder, for convenience. A light powered (i.e., "solar cell") calculator 44 may also be installed upon the shopper's assistance panel 16, to provide further assistance to the shopper in determining quantities required, unit pricing where such is not available, etc. In addition, a coupon storage pocket 46 is preferably included on the panel 16. At least the upper panel of the storage pocket 46 is preferably formed of transparent plastic, enabling the shopper to readily view various coupons inserted therein for the shopping trip.

In addition to the above features, the shopper's assistance panel 16 preferably includes one or more article support hooks 48 formed in the edges of the panel. These hooks are preferably formed of the same sheet of material of which the panel 16 is formed, and allow the shopper to hang such articles as a key chain, cell phone, umbrella, etc. for easy retrieval during the shopping trip. The hooks 48 are preferably recessed into the edges of the panel 16 in order to avoid their protrusion from the panel, but this may depend upon the remaining area available on the panel 16 after installation of the various features and components noted further above.

Further convenience may be provided to the shopper by an optional cupholder 50 extending from the panel 16. The cupholder is preferably attached as a separate component, pivotally captured between a pair of cupholder supports 50a and 50b that are in turn attached to the underside of the shopper's assistance panel. The cupholder 50 may be configured to hold a conventional disposable cup or can of beverage, and/or may be configured to hold a baby bottle or other infant necessities during the shopping trip. The illustrated cupholder 50 is exemplary; any of a number of different cupholder configurations, both fixed and adjustable or movable, may be provided as desired. A pivotally mounted cupholder allows a cup or vessel contained therein to remain vertical regardless of the orientation of the shopper's assistance panel 16, as it will take on different angles depending upon the angle of the back of the shopping cart and corresponding rest angle of the child's activity panel 14 thereagainst.

FIG. 3 illustrates details of the child's activity panel 14. The child's activity panel includes a series of shopping completion columns 52a, 52b, etc., through 52f in the example of FIG. 3; more or fewer such columns may be provided as desired. Each of the columns 52a through 52f includes a series of shopping completion indicators, e.g., indicators 54b and 54c, represented as check marks or other indicators as desired to indicate that the specific shopping task has been completed. A plurality of number columns 56a through 56f (in the example of FIG. 3) alternate with the completion columns 52a through 52f, with each number column being placed immediately to the left of the corresponding completion column. Each of the number columns includes a series of consecutive integers thereon, e.g., the numbers one through five of the first number column 56a, indicated by the reference numerals 58a through 58e in FIG. 3. (It will be noted that the second and third numbers are covered in the example of FIG. 3, with only the first, fourth, and fifth numbers 58a, 58d, and 58e showing in the first number column 56a.) In the example of FIG. 3, the child's activity panel includes a first numbered column 56a having the numbers one through five thereon, a second number column 56b having the numbers six through ten thereon, continuing through the sixth number column 56f having the numbers twenty-six through thirty thereon. Again, the specific quantity of shopping completion columns and number columns, and the quantity of positions in each, may be adjusted as desired.

A plurality of hinge pintles or rods 60a through 60f extends vertically down the activity panel 14, with each of the hinge pintles being positioned between the corresponding number column and shopping completion column, e.g., hinge rod 60a is positioned between the first number column 56a and the first completion column 52a, etc. A plurality of cover flaps 62 is pivotally attached to each of these hinge pintles 60a through 60e, with the number of cover flaps corresponding to the number of shopping completion and number positions along each column. In the example of FIG. 3, five such cover flaps 62 are installed along each of the hinge rods or pintles, thus providing a total of thirty such cover flaps in the five row and six column matrix of the activity panel 14.

Each of the cover flaps 62 has a representation of a shopping commodity on each of its two opposite sides. Each of the shopping commodity representations of each cover flap is different from the others, i.e., there are no duplicates on the various cover flaps 62. However, the same commodity (e.g., fruit vegetable, meat, canned, bottled, bagged, and boxed items, etc.) is shown on both sides of each cover flap 62, as the cover flaps are hinged or pivoted from one position to the other by a child using the activity panel 14 during the course of a shopping trip. In the example of FIG. 3, it will be seen that the second and third cover flaps, i.e., the flaps corresponding to the number two and number three positions, have been flipped to the left to cover those numbers and expose the corresponding shopping completion indicators 54b and 54c. The second sides or faces 62b are exposed, with the commodity representation (e.g., bananas and cherry tomatoes, in the example shown) being visible. This indicates that those items have been selected and placed in the shopping cart. It will be noted that a third cover flap 62 corresponding to the number ten on the panel 14, has been partially pivoted to the left, with its first face 62a still being visible. Continued movement of the tenth cover flap to the left, to cover the number ten and expose the corresponding shopping completion indicator, would indicate that that particular shopping task has been completed.

The child's activity panel 14 is used to educate and entertain a small child who has been placed upon the child seat 12 within the child seating area of the shopping cart S, generally as shown in FIG. 1 of the drawings. The child's activity panel 14 may be secured positively to the structure of the shopping cart S by suitable ties or straps 64 (e.g., hook and loop fasteners, etc.). The straps 64 are permanently attached to the upper side portions of the child's activity panel 14. The use of the ties or straps 64 prevents a child from banging the activity panel 14 against the back of the cart S and shaking or jarring the shopper's assistance panel 16 extending therefrom.

The shopper engages in the shopping trip, while pointing out to the child the commodities being selected and showing the child the corresponding representation on the corresponding cover flap. The child then flips over the corresponding cover flap to cover the number and expose the completion checkmark or other indicator. In this manner, a child may learn about various foods and commodities, food groups and nutrition, basic numbers from one to thirty (or whatever the maximum number of positions may be on the panel 14), the importance of keeping a list and how to track items on the list, and other matters important in daily life. Meanwhile, the child's activity panel 14 also keeps the child occupied during the shopping trip, reducing boredom and the chance of tantrums or other undesirable behavior. The provision of a number of desirable features for the shopper, along with the advantages described above for the child's panel, will provide a valuable device that will be most appreciated by shoppers everywhere.

It is to be understood that the present invention is not limited to the embodiments described above, but encompasses any and all embodiments within the scope of the following claims.

I claim:

1. A shopping cart organizer, comprising:
    a rigid child's seat bottom panel having a forward edge and a rearward edge opposite the forward edge;
    a rigid child's activity panel having a lower edge directly attached to the rearward edge of the child's seat bottom panel and an upper edge opposite the lower edge, the child's activity panel further includes:
        i) a plurality of shopping completion columns, each of the columns containing a plurality of shopping completion indicators thereon;
        ii) a plurality of number columns, each of the number columns having a plurality of numbered positions thereon, the numbered positions being in consecutive order, the number columns alternating with the shopping completion columns; and
        iii) a plurality of pivotally attached cover flaps disposed between each of the shopping completion columns and the corresponding one of the number columns, each of the cover flaps having a first side having a shopping commodity representation thereon, and a second side opposite the first side having a shopping commodity representation thereon identical to the shopping commodity representation of the first side, each of the cover flaps having a different set of shopping commodity representations thereon from one another and selectively covering either the corresponding one of the shopping completion indicators or the corresponding one of the numbered positions; and
    a rigid shopper's assistance panel having a forward edge attached to the upper edge of the child's activity panel, the rigid shopper's assistance panel and the rigid child's activity panel being integrally formed in one-piece, a rearward edge opposite the forward edge, and first and second lateral edges extending between the forward edge and the rearward edge.

2. The shopping cart organizer according to claim 1, wherein the shopper's assistance panel further includes:
    at least one shopping informational chart disposed thereon;
    a shopping list holder attached thereto;
    a coupon storage pocket disposed thereon;
    a calculator operably installed thereon; and
    a writing implement holder installed thereon.

3. The shopping cart organizer according to claim 1, wherein:
    the child's seat bottom panel is pivotally attached to the child's activity panel.

4. The shopping cart organizer according to claim 1, further including at least one article support hook disposed along at least one of the edges of the shopper's assistance panel.

5. The shopping cart organizer according to claim 1, wherein the child's seat bottom panel is upholstered.

6. The shopping cart organizer according to claim 1, further including a cupholder extending from the shopper's assistance panel.

7. The shopping cart organizer according to claim 1, wherein child's activity panel includes at least one opening adjacent the lower edge for placement of the child's legs therethrough.

8. A shopping cart organizer, consisting of:
    a rigid child's seat bottom panel having a forward edge and a rearward edge opposite the forward edge;
    a rigid child's activity panel having a lower edge directly, pivotally attached to the rearward edge of the child's seat bottom panel and an upper edge opposite the lower edge, whereby the child's activity panel defines a first dimension, the child's activity panel includes at least one opening adjacent the lower edge for placement of the child's legs therethrough, the child's activity panel further including activity means for engaging the attention of a child, the activity means being located above the at least one opening and adjacent the upper edge; and
    a rigid shopper's assistance panel having a forward edge coextensive with and attached to the upper edge of the child's activity panel at an angle, the rigid shopper's assistance panel and the rigid child's activity panel being integrally formed in one-piece, a rearward edge opposite the forward edge thereby defining a second dimension less than the first dimension, and first and second lateral edges extending between the forward edge and the rearward edge.

* * * * *